(12) United States Patent
Webster

(10) Patent No.: US 9,400,082 B2
(45) Date of Patent: Jul. 26, 2016

(54) CAMERA MOUNTING SYSTEM

(71) Applicant: Marc W. Webster, Glendale, CA (US)

(72) Inventor: Marc W. Webster, Glendale, CA (US)

( * ) Notice: Subject to any disclaimer, the term of this patent is extended or adjusted under 35 U.S.C. 154(b) by 0 days.

(21) Appl. No.: 14/203,193

(22) Filed: Mar. 10, 2014

(65) Prior Publication Data

US 2014/0252188 A1 Sep. 11, 2014

Related U.S. Application Data

(60) Provisional application No. 61/775,638, filed on Mar. 10, 2013.

(51) Int. Cl.
| | |
|---|---|
| *F16B 1/00* | (2006.01) |
| *F16M 13/02* | (2006.01) |
| *F16M 11/14* | (2006.01) |
| *F16M 13/00* | (2006.01) |
| *G03B 17/56* | (2006.01) |
| *F16B 2/08* | (2006.01) |

(52) U.S. Cl.
CPC ............ *F16M 13/022* (2013.01); *F16M 11/14* (2013.01); *F16M 13/00* (2013.01); *G03B 17/561* (2013.01); *F16B 2/08* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 1,735,212 | A | * | 11/1929 | Pawsat | 248/229.24 |
| 3,966,101 | A | * | 6/1976 | Taylor, III | 224/219 |
| 4,325,529 | A | * | 4/1982 | Seebinger | 248/218.4 |
| 4,548,377 | A | * | 10/1985 | Huel | 248/219.1 |
| 5,310,151 | A | * | 5/1994 | Engel | 248/230.8 |
| 5,497,214 | A | * | 3/1996 | Labree | 396/428 |
| 5,649,257 | A | * | 7/1997 | Kempka | 396/428 |
| 5,833,188 | A | * | 11/1998 | Studdiford et al. | 248/229.17 |
| 5,938,155 | A | * | 8/1999 | Garland | 248/187.1 |
| 5,941,434 | A | * | 8/1999 | Green | 224/250 |
| 6,021,984 | A | * | 2/2000 | Mills | 248/219.4 |
| 6,059,245 | A | * | 5/2000 | Hermansen et al. | 248/311.2 |
| 6,349,905 | B1 | * | 2/2002 | Mills | 248/126 |
| 6,457,838 | B1 | * | 10/2002 | Dugmore et al. | 362/106 |
| 6,752,516 | B1 | * | 6/2004 | Beadle | 362/647 |
| 6,899,255 | B2 | * | 5/2005 | Pringle | 224/221 |
| 6,938,865 | B1 | * | 9/2005 | Day | 248/229.14 |
| 6,955,484 | B2 | * | 10/2005 | Woodman | 396/423 |
| 7,604,420 | B2 | * | 10/2009 | Moody et al. | 396/419 |
| 7,618,260 | B2 | * | 11/2009 | Daniel et al. | 439/37 |
| 7,942,293 | B2 | * | 5/2011 | Lawrence et al. | 224/218 |
| 8,714,421 | B2 | * | 5/2014 | Norling | 224/197 |
| 8,746,993 | B2 | * | 6/2014 | Sherwood | 396/428 |
| 9,071,675 | B2 | * | 6/2015 | Willenborg | |
| 2001/0018311 | A1 | * | 8/2001 | Musacchia | 446/418 |
| 2003/0075652 | A1 | * | 4/2003 | Studdiford et al. | 248/229.17 |
| 2005/0045681 | A1 | * | 3/2005 | Hancock et al. | 224/401 |
| 2006/0197001 | A1 | * | 9/2006 | Parker et al. | 248/230.8 |
| 2008/0245938 | A1 | * | 10/2008 | Qualy et al. | 248/218.4 |
| 2009/0321483 | A1 | * | 12/2009 | Froloff | 224/267 |

(Continued)

*Primary Examiner* — Monica Millner
(74) *Attorney, Agent, or Firm* — Brooks Acordia IP Law, PC; Michael Zarrabian

(57) ABSTRACT

A mounting system for mounting a load on a structure, comprising a first strap having a distal end and a proximal end, a first clamp body for supporting a load, the first clamp body including a catch mechanism for engaging at least one end of the strap, the first clamp body further including a clamp mechanism for engaging a structure, wherein the strap is configured for tightening around at least a portion of the structure and engaging with the catch mechanism of the first clamp body, to maintain the clamping mechanism of the first clamp body on the structure.

20 Claims, 25 Drawing Sheets

(56) References Cited

U.S. PATENT DOCUMENTS

| | | | |
|---|---|---|---|
| 2010/0005636 A1* | 1/2010 | Liao et al. | 24/652 |
| 2010/0200715 A1* | 8/2010 | Kuipers | 248/221.11 |
| 2010/0239241 A1* | 9/2010 | Chou | 396/427 |
| 2010/0316369 A1* | 12/2010 | Pyle | 396/423 |
| 2012/0024918 A1* | 2/2012 | DeCamp et al. | 224/267 |
| 2012/0167437 A1* | 7/2012 | Holmberg | 42/90 |
| 2013/0004153 A1* | 1/2013 | McKee et al. | 396/420 |
| 2013/0101277 A1* | 4/2013 | Barreiro | 396/55 |
| 2013/0170823 A1* | 7/2013 | McDonald et al. | 396/428 |
| 2013/0175413 A1* | 7/2013 | Waugh | 248/124.1 |
| 2014/0191095 A1* | 7/2014 | Le Gette et al. | 248/176.3 |

* cited by examiner

100

100

100

200

200

100

100

100

400

400

400

100

300

300

CAMERA MOUNTING SYSTEM

CROSS-REFERENCE TO RELATED APPLICATIONS

This application claims the priority benefit of U.S. Provisional Patent Application Ser. No. 61/775,638, filed Mar. 10, 2013, incorporated herein by reference in its entirety.

FIELD OF THE INVENTION

The present invention related to mounting systems for vehicles, and in particular to camera mounting systems.

BACKGROUND

The ability to film action sequences, such as those of individuals engaged in sports, can be both cumbersome and out of the realm of an average user due to the cost of specialty video systems. With the advent of the action camera, point and shoot digital camera and DSLR camera, users may film actions sequences with low investment. However, this requires specialized mounts designed for each camera to stably hold that camera to a vehicle or object used as a platform for the camera. Conventionally, each application requires a specialized mount and costs associated therewith.

BRIEF SUMMARY

In one embodiment, a mounting system for mounting a load on a structure, comprises a first strap having a distal end and a proximal end, a first clamp body for supporting a load, the first clamp body including a catch mechanism for engaging at least one end of the strap, the first clamp body further including a clamp mechanism for engaging a structure, wherein the strap is configured for tightening around at least a portion of the structure and engaging with the catch mechanism of the first clamp body, to maintain the clamping mechanism of the first clamp body on the structure.

In one embodiment, a proximal end of the strap is removably engaged with the catch mechanism, and the the strap is configured for tightening around at least a portion of the structure and engaging said distal end of the strap with the catch mechanism of the first clamp body, to maintain the clamping mechanism of the clamp body on the structure.

In one embodiment, the mounting system further comprises a second strap having a distal end and a proximal end, a second clamp body, the second clamp body including a catch mechanism for engaging at least one end of each strap, and the second clamp body further including a clamp mechanism for engaging a structure. The catch mechanism of the first clamp body is configured for engaging at least one end of each strap. The first strap is configured for tightening around at least a portion of the structure between the catch mechanism of the first clamp body and the catch mechanism of the second clamp body. The second strap is configured for tightening around at least a portion of the structure between the catch mechanism of the first clamp body and the catch mechanism of the second clamp body. Whereby, the first clamp body and the second clamp body are maintained on the structure.

These and other features, aspects and advantages of the present invention will become understood with reference to the following description, appended claims and accompanying figures.

DETAILED DESCRIPTION OF THE INVENTION

Figure 1:
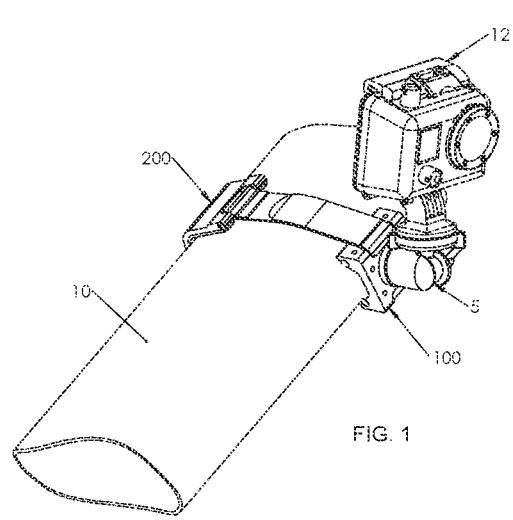
FIG. 1 is a perspective view of an embodiment of a camera mounting system comprising a front mount assembly and a rear mount assembly that can be attached to a tubular structure in a strut mount configuration.

The embodiments are illustrated by way of example, and not by way of limitation, in the Figures of the accompanying drawings and in which like reference numerals refer to similar elements.

Embodiments of a versatile camera mounting system are disclosed herein. The camera mounting system allows mounting of video or still camera equipment to vehicles and objects operating on land, sea or air. The camera mounting system allows a camera system to be quickly installed prior to use and removed quickly.

In one embodiment the camera mounting system comprises a set of camera mount assemblies that facilitate simplified and rapid attachment and removal of a camera system from a platform such as a vehicle, object or structure. In one embodiment the camera mounting system can be configured for attachment to vehicles or objects. The camera mounting system can be configured to cooperate with and/or engage mounting surfaces such as e.g., tubular structures of varying diameters.

Such tubular structures are used on many terrain vehicles, race cars, sail boats, hang gliders, airplanes, scuba tanks, metal hand rails, speedy rail or any other object where a mounting surface has a curved or cylindrical diameter. The camera mounting system can also be configured in multiple sizes to meet a range of varying mounting diameters (e.g. small, medium, large) and so forth.

Because the camera mount requires no mounting holes to be added to, or exist on, a mounting surface, and the mount is only semi-permanently attached, and there is no need for governmental approval for the use on a general aviation aircraft.

According to embodiments of the camera mounting system, the camera mount assemblies may be used in conjunction with one another to configure camera mounting system for different applications as noted by examples above. Referring to the drawings, the camera mount assemblies comprise: front mount assembly 100, rear mount assembly 200, adjustable rear mount assembly 300, and heavy load mount assembly 400. In one embodiment, the camera mounting system can be mounted on structures having arcuate surfaces such as circular, tubular, curvilinear, etc.

Referring to the drawings, FIGS. 2, 3-5, 8A-8C, illustrate a first embodiment of the camera mounting system comprising an assembly 100, for a first configuration of the camera mounting system as a Tubular Mount Configuration, described in more detail further below.

FIGS. 1, 6A-6B, 7A-7C, illustrate a second embodiment of the camera mounting system, comprising assemblies 100 and 200, for a second configuration of the camera mounting system as a Strut Mount Configuration, described in more detail further below.

FIGS. 11A-11B, 12A-12C, illustrate a third embodiment of the camera mounting system, comprising assemblies 100 and 300, for a third configuration of the camera mounting system as a Adjustable Rear Strut Clamp configuration, described in more detail further below.

Figure 13:
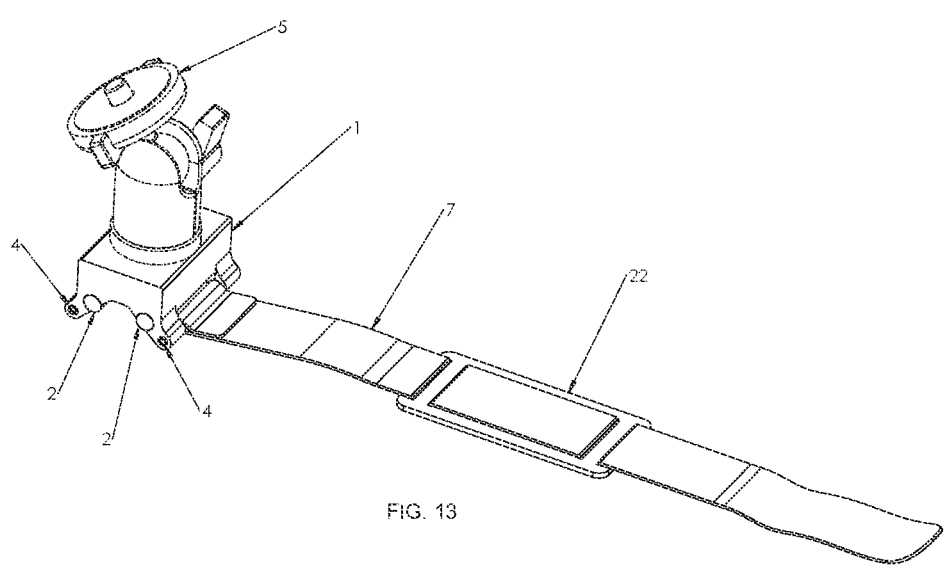
FIG. 13 shows a perspective view of an embodiment of the camera mounting system including the front mount assembly in a bund strap configuration.
Figure 14A:
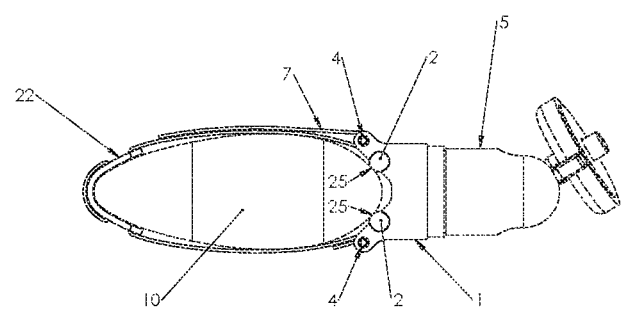
FIG. 14A is a side view of the front mount assembly in a bund strap configuration, illustrating securing the camera mounting system to a structure via a bund strap.
Figure 14B:
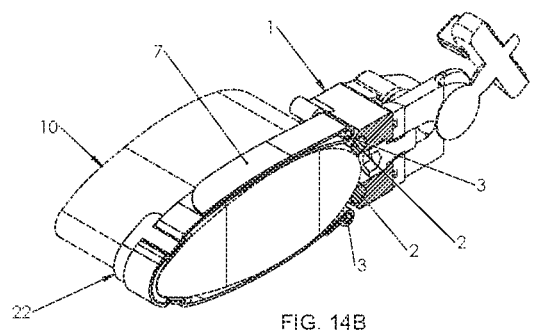
FIG. 14B is a cross-section view of FIG. 14A, illustrating securing the camera mounting system to a structure via a bund strap.

FIGS. 13, 14A-14B, illustrate a fourth embodiment of the camera mounting system, comprising an assembly 100 and a bund 22, for a fourth configuration of the camera mounting system as a Front Clamp Bund configuration, described in more detail further below.

Figure 9A:
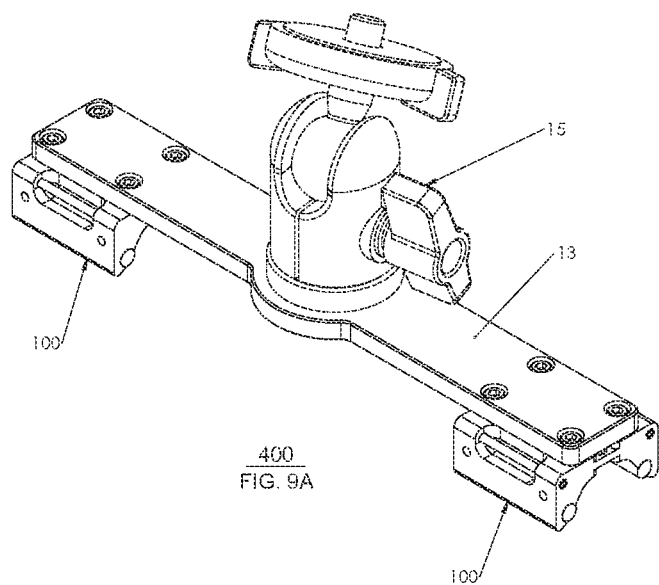
FIGS. 9A-9C illustrate an embodiment of the camera mounting system for a heavy payload configuration.
Figure 9B:
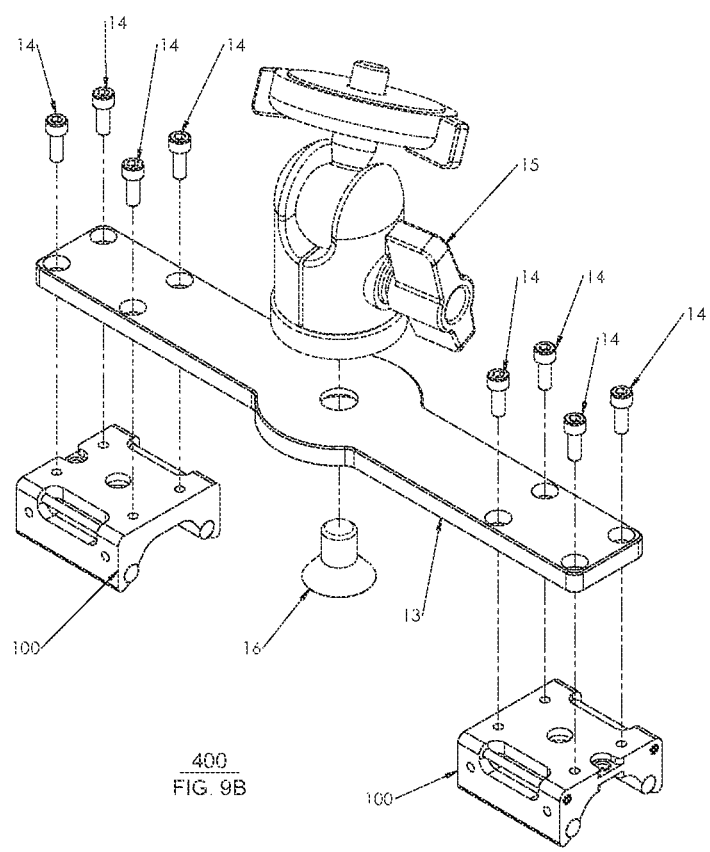
Figure 9C:
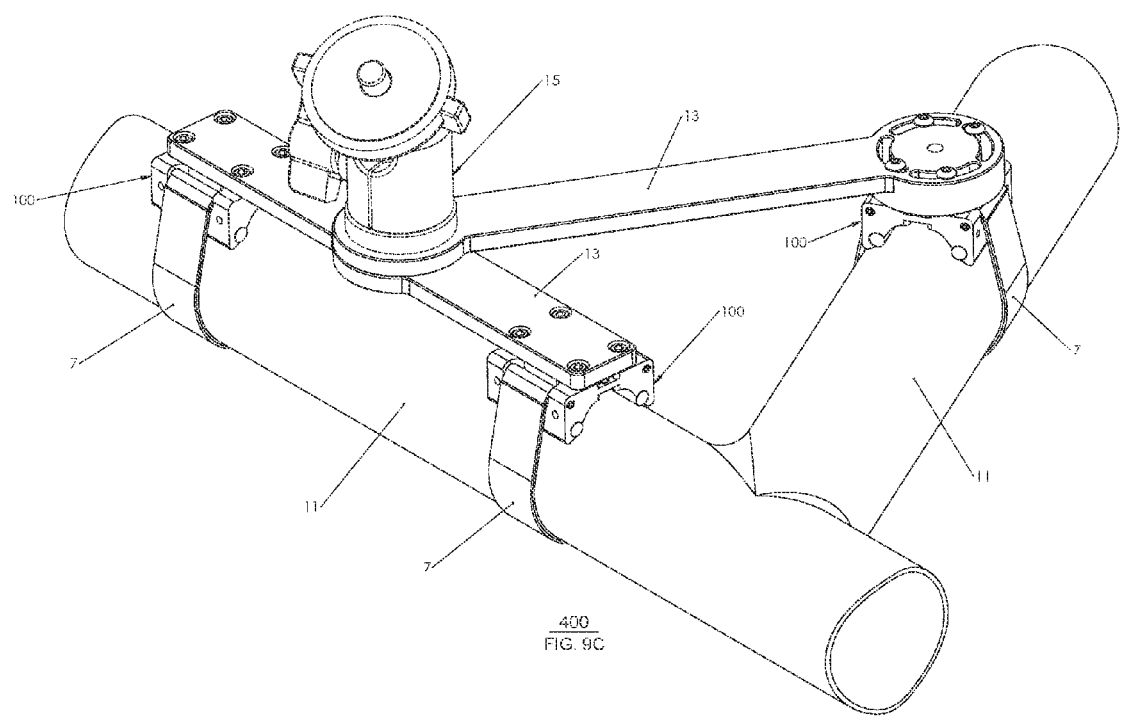

FIGS. 9A-9C, illustrate a fifth embodiment of the camera mounting system, comprising an assembly 400 for a fifth configuration of the camera mounting system as a Heavy Payload configuration.

Those skilled in the art recognize that other configurations of the camera mounting system using said assemblies 100-400 and other elements can be achieved for different applications, within the scope of the camera mounting system disclosed herein.

This configuration is useful for attaching the camera mounting system to any item, structure or vehicle where the mounting surface has a curved or cylindrical diameter that falls within the range the subsequent mount is designed for.

Figure 2:
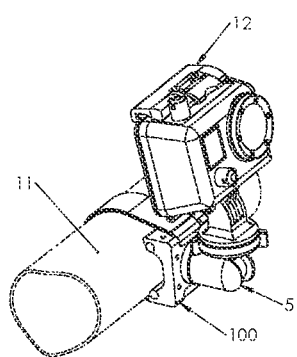
FIG. 2 is a perspective view of an embodiment of a camera mounting system comprising a front mount assembly that can be attached to a tubular structure in a tubular mount configuration.
Figure 3:
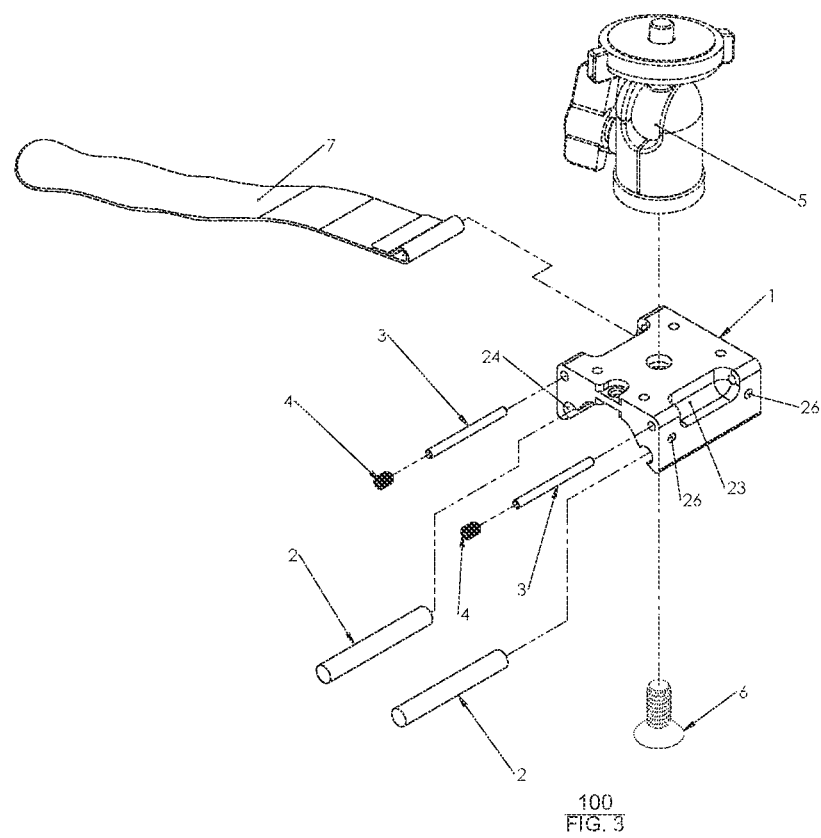
FIG. 3 is an exploded view of the front mount assembly of FIG. 2.

Referring to the drawings, FIGS. 2, 3-5, 8A-8C, illustrate a first embodiment of the camera mounting system comprising an assembly 100, for a first configuration of the camera mounting system as a Tubular Mount Configuration. FIG. 2 is a perspective view of an embodiment of the camera mounting system comprising the assembly 100 attached to a tubular structure 11. FIG. 3 is an exploded view of the assembly 100. The assembly 100 comprises: a main front clamp body 1, rubber clamping feet 2, strap mounting rods 3, set screws 4, and strap 7. A camera interface ball mount 5 for the camera 12 (FIG. 2) can be attached to the main front clamp body 1 using a mounting screw 6.

In this embodiment, the clamp body 1 comprises an essentially rectangular member having a support surface for engaging a camera system, and a clamping surface having clamping members such as rubber clamping feet.

The main front clamp body 1 includes radial cutout features 24 to accept said pair of the rubber clamping feet 2 which are held in place with an interference fit. Pocket features 23 are machined in the front clamp body 1 to accept the strap mounting rods 3, which are held in place by set screws 4. By removing the set screws 4, the rods 3 can be easily removed to allow different length straps 7 to be installed to meet the required mounting needs.

Figure 4:
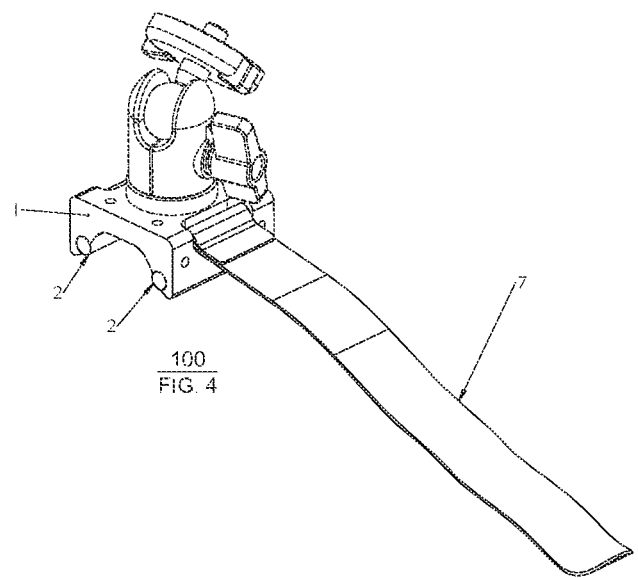
FIG. 4 is a perspective view of the front mount assembly of FIG. 3 in free standing form.

FIG. 4 is a perspective view of the assembly 100 configured for tubular mount configuration, which is achieved by attaching the strap 7 to the front clamp assembly using removable strap mounting rods 3. Each elongated flexible strap 7 has a proximal end attached to the clamp body, and a free distal end. For example, the proximal end of the strap 7 is shown having an eye loop through which a corresponding rod 3 is passed, and then that rod 3 is secured to the clamp body 1 via a pair set screws 4 as shown. The rods 3 provide a catch mechanism for engaging the strap 7.

Figure 8A:
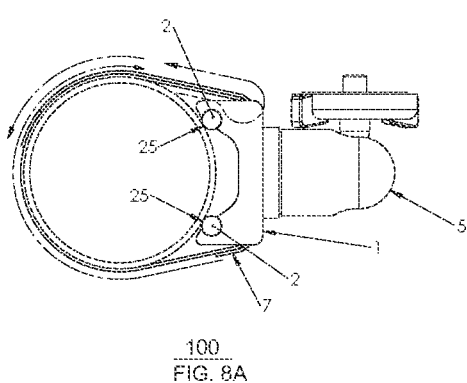
FIG. 8A is a side view of the front mount assembly of FIG. 2, illustrating a process for securing the front clamp body to a structure via a strap.
Figure 8B:
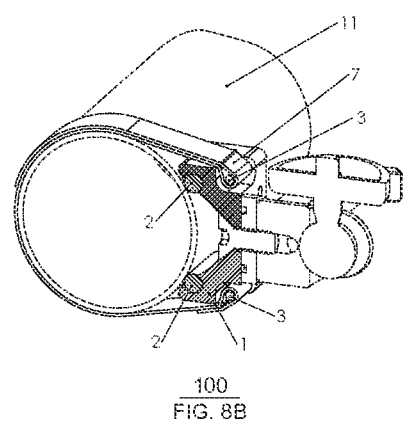
FIG. 8B is a perspective cross-section view of the front mount assembly of FIG. 8A, illustrating a process for securing the front clamp body to a structure via a strap.
Figure 8C:
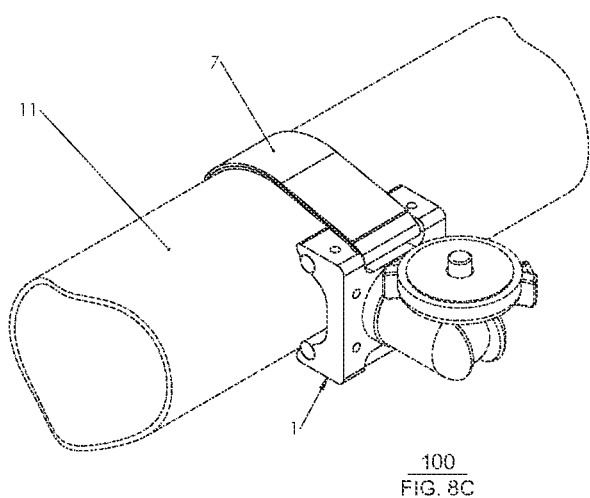
FIG. 8C is a perspective view of the assembly front mount assembly of FIG. 8A, illustrating a process for securing the front clamp body to a structure via a strap.

FIG. 8A-8C illustrate manner of mounting the assembly 100 on an object such as structure 11. FIG. 8A is a side view of the assembly 100 for tubular mount configuration, wherein the dashed arrow illustrates a process of feeding the free distal end of the strap 7 around an upper rod 3 for securing the clamp 1 to structure 11 having a tubular profile. FIG. 8B is a perspective cross-section view of the assembly 100 of FIG. 8A, for the tubular mount configuration. FIG. 8C is a perspective view of the assembly 100.

Figure 5:
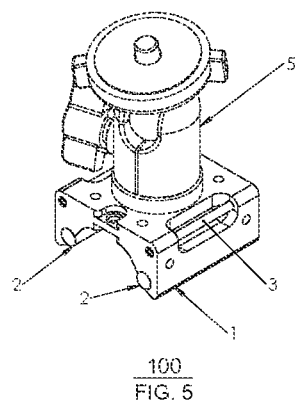
FIG. 5 is a perspective view of the front clamp body of the front mount assembly of FIG. 2.

As shown in FIGS. 8A-8C, the strap 7 is attached to a rod 3 at one end. The strap 7 is then wrapped around the object (e.g., tubular structure 11), and a free end of the strap 7 passed under the second, opposing, rod 3 and redirected back around rod 3 and pulled tight. In one embodiment the strap 7 comprises a Velcro strap which allows the free end of the strap 7 to be folded onto itself and secured. This allows the clamp body 1 to remain engaged with the structure 11 and provide a stable support. As shown in FIG. 2, a camera interface ball mount 5 can be attached to the main front clamp body 1 using a mounting screw 6, which is illustrated in FIG. 5. The camera 12 is affixed to the threaded stud on the camera ball mount 5 using a threaded interface on the camera 12.

This configuration is useful for attaching the camera mounting system to a wing strut of an aircraft. FIGS. 1, 6A-6B, 7A-7C, illustrate a second embodiment of the camera mounting system, comprising assemblies 100 and 200, for a second configuration of the camera mounting system as a Strut Mount Configuration.

In this configuration, the camera mounting system is specially adapted for use on a wing strut of a general aviation aircraft using a rear mount assembly 200 (i.e., rear clamp). In the case of mounting to aircraft, the camera mounting system is configured to mount to a lift strut of aircraft so equipped. For mounting surfaces such as struts where the leading edge and trailing edge are not a uniform diameter as in a tube, the assembly 200 may be used.

This assembly 200 is also useful with sailboat masts, bicycles or any other mounting surface (structure) with tubing having a similar shape to an aircraft strut. Different straps can be installed to facilitate larger and smaller tubular shapes.

FIG. 5 is a perspective view of the clamp body 1 which can be used for the strut mount configuration by the omission of the strap 7 used in the tubular mount configuration. In the strut mount configuration, strap 7 is detached from the clamp body 1, and instead used in the assembly 200. The mounting rods 3 are retained in the clamp body 1 as a redirect for the straps 7 as shown in FIG. 6A (or for the adjustable rear strut clamp assembly 300 shown in FIG. 11A, described further below).

Figure 6A:
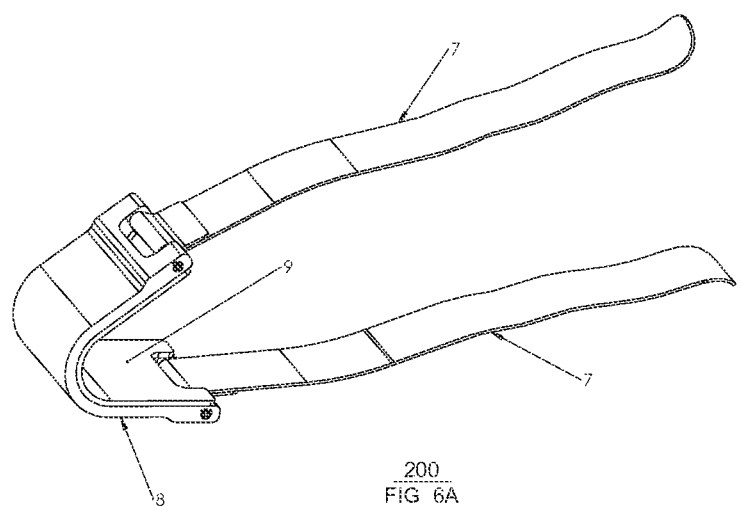
FIG. 6A is a perspective view of an embodiment of a camera mounting system comprising a rear mount assembly that can be attached to a strut structure in conjunction with a front camp body, in a strut mount configuration shown in FIG. 1.
Figure 6B:
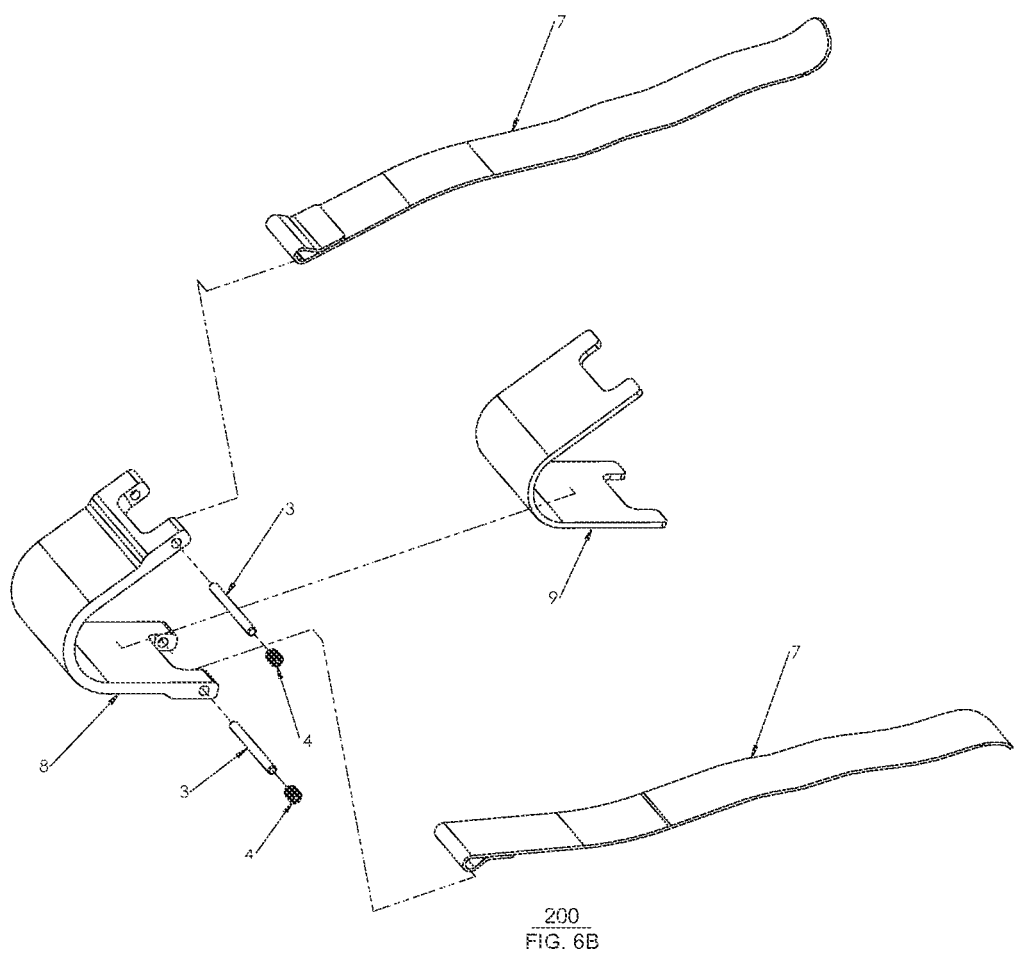
FIG. 6B shows the rear mount assembly in exploded view.

FIG. 6A shows a perspective view of the assembly 200, and FIG. 6B shows the assembly 200 in exploded view. The rear strut clamp assembly 200 comprises an arcuate rear clamp body 8, having pocket features 23 machined that accept the strap mounting rods 3 which are held in place by set screws 4. A pair of straps 7 (upper strap and lower strap) are used, wherein an end of each strap 7 is fixedly engaged with a corresponding rod 3. For example, an end of each strap 7 may have an eye loop through which a corresponding rod 3 is passed, and then that rod 3 is secured to the clamp body 8 via a pair set screws 4 as shown.

By removing the set screws 4, the rods 3 can be easily removed to allow different length straps 7 to be installed to meet the required mounting needs. On the inside of the rear clamp body 8 a rubber sheet 9 may be attached for more secure engagement with the strut 10 (FIG. 1). The rubber sheet 9 may have an adhesive on one side that allows it to be attached to the clamp body 8. The rubber sheet 9 contacts the strut 10 when in use and bites into the strut when under tension of the straps 7, and also keeps the strut 10 from being damaged by the use of the camera mount system.

Figure 7A:
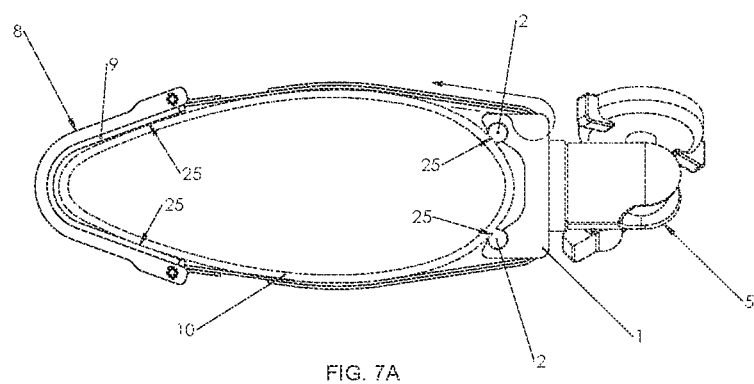
FIG. 7A is a side view of the rear mount assembly of FIG. 6A, illustrating a process for securing camera mounting system to a structure via dual straps.
Figure 7B:
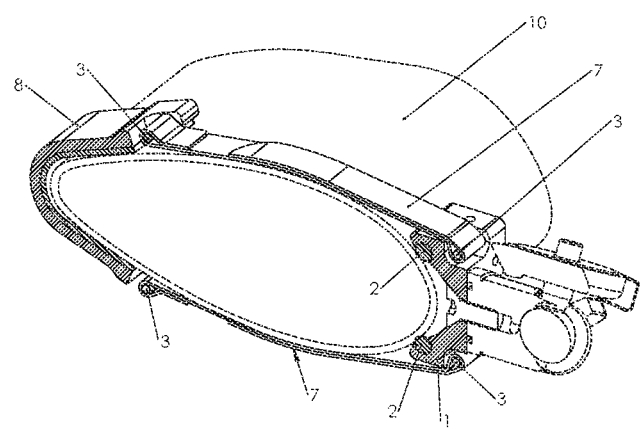
FIG. 7B is a perspective cross-section view of the front mount assembly of FIG. 7A, illustrating a process for securing the camera mounting system to a structure via dual straps.
Figure 7C:
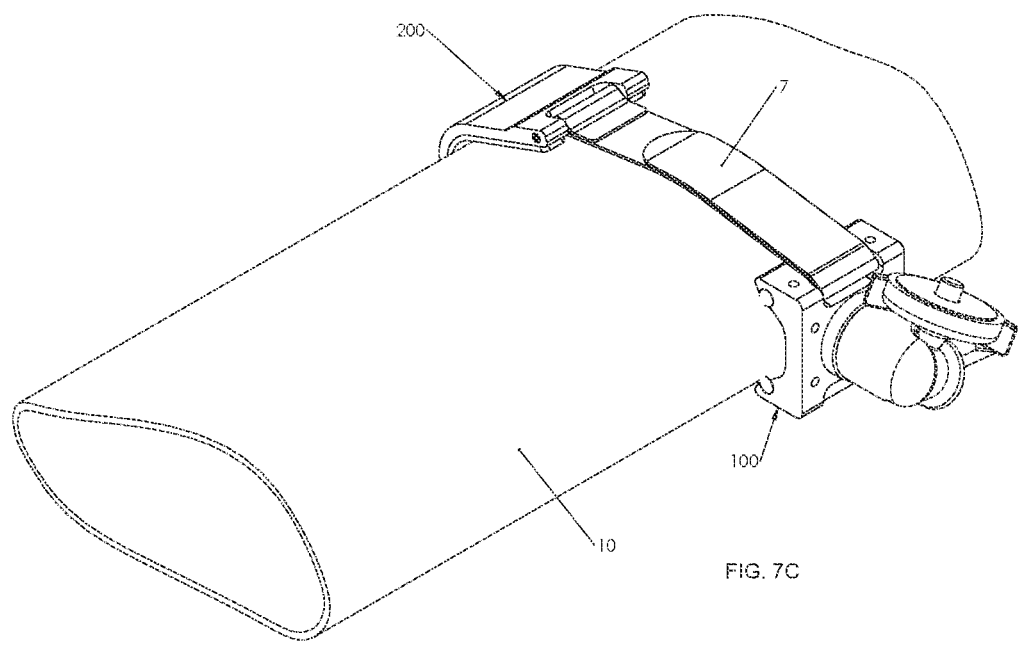
FIG. 7C is a perspective view of the assembly front mount assembly of FIG. 7A, illustrating a process for securing camera mounting system to a structure via dual straps.

In this embodiment of the camera mounting system for strut mount configuration, the rear strut mount assembly 200 is used with the clamp body 1 shown in FIG. 5. FIGS. 7A-7C show a process of manner of mounting the clamp body 1 and clamp body 8 to a strut using a pair of Velcro straps 7. FIG. 7A is a side view of the clamp body 1 and clamp body 8 for strut mount configuration, wherein the dashed arrow illustrates a process of feeding an upper strap 7 around an upper rod 3 for securing the clamps 1 and 8 to strut structure 10. The same process is used for feeding a lower strap 7 around a lower rod 3. FIG. 7B is a perspective cross-section view of the assembly 100 of FIG. 8A, for the tubular mount configuration. FIG. 7C is a perspective view of the clamps 1 and 8 secured to the strut 10 via the pair of straps 7.

Each strap from the clamp body 8 is threaded through the corresponding strap mounting rod 3 on the clamp body 1 and redirected toward the rear and drawn tight around strut 10, as shown. As in the tubular mount configuration involving one strap 7, in the strut mount configuration when each strap 7 is drawn tight, the rubber clamping feet 2 of the clamp 1 contact a front of the strut 10 providing a non-marring clamping force. At the same time, the rubber sheet 9 in the rear clamp body 8 contacts a rear portion of the strut 10 providing an additional clamping force. FIG. 7A illustrates contacts between the front and rear body clamps with the strut 10, illustrated as tangent points 25 where elements 2 and 9 engage the surfaces of strut 10.

Further, as shown in FIGS. 7A-7C use of two separate straps 7 provides secure grip on the strut 10 should clamp 1 attempt to roll forward or aft on the strut 10. As the front clamp 1 attempts to roll, one strap 7 becomes tighter than the opposing strap 7, thus preventing the camera mounted on the clamp 1 from rolling or moving.

The camera mounting system can be quickly reconfigured between Strut Mount Configuration and Tubular Mount Configuration by the removal or addition of a clamp assembly 200 (or assembly 300) as well as swapping out mounting straps 7, as needed, to work with differing mounting needs. The strap mounting rods 3 are easily removable or secured via set screws 4. In changing between Strut Mount Configuration and Tubular Mount Configurations, the set screws 4 can be removed which will allow the strap mounting rods 3 to be removed as needed to change or remove straps 7 as needed.

FIGS. 11A-11B, 12A-12C, illustrate a third embodiment of the camera mounting system, comprising assemblies 100 and 300, for a third configuration of the camera mounting system as a Adjustable Rear Strut Clamp configuration.

Figure 11A:
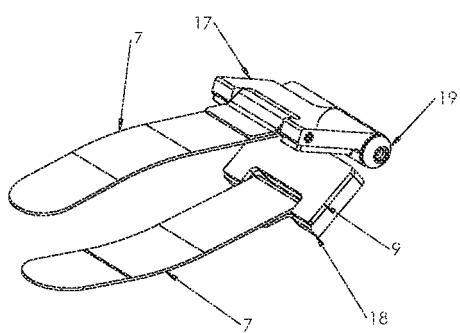
FIG. 11A shows an embodiment of the camera mounting system including an adjustable rear mount assembly used in conjunction with the front mount assembly, in an adjustable ear strut configuration.
Figure 11B:
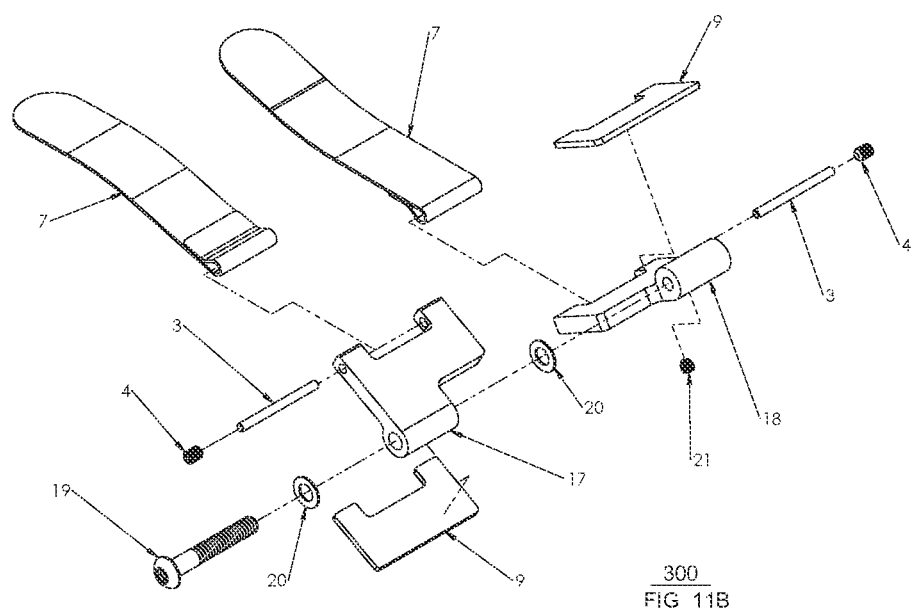
FIG. 11B shows an exploded view of the adjustable rear mount assembly of FIG. 11A.

FIG. 11A shows an embodiment of the adjustable rear strut clamp assembly (i.e., adjustable rear mount assembly) 300 which is used in conjunction with the clamp body 1 of the front mount assembly 100. FIG. 11B shows the adjustable rear strut clamp assembly 300 in an exploded view. The adjustable rear clamp assembly 300 comprises an adjustable clamp body having upper jaw 17 hinged to a lower jaw 18 via a clamp screw 19. The jaws 17 and 18 are adjusted to a desired angle relative to one another to match the angle of the strut 10, and clamp screw 19 is tightened.

Two serrated Belleville washers 20 are disposed on the screw 19 to engage the sides of the adjustable upper clamp jaw 17 and lower clamp jaw 18, thus essentially locking in position said angle between the jaws 17 and 18. The lower clamp jaw 18 is threaded to accept clamp screw 19 which is locked in place with the knurled set screw 21. Each of the adjustable jaws 17 and 18 include pocket features 23 machined to accept a corresponding mounting rod 3 which is held in place by a pair of set screws 4. By removing the set screws 4 the strap mounting rods 3 can be easily removed to allow desired length straps 7 to be installed to meet the required mounting needs.

On inside surfaces of each of the clamp jaws 17 and 18, a rubber sheet 9 is attached. Each rubber sheet 9 has an adhesive on one side for secure attachment to the corresponding clamp jaw. When mounting the assembly 300, each rubber sheet 9 contacts the strut 10 and engages the strut when under tension of tightened straps 7, as described further below. This protects the strut 10 from damage while the camera system is mounted.

For each of the clamp jaws 17 and 18, an end of corresponding strap 7 includes an eye loop that allows a rod 3 to pass through, such that when the rod 3 is secured to the clamp jaw via set screws 4, the strap 7 is securely attached to the corresponding clamp jaw.

Figure 12A:
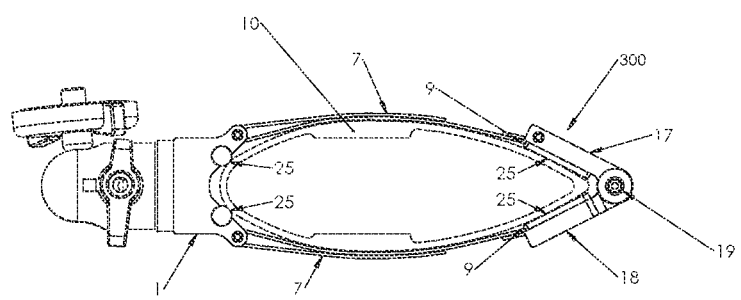
FIG. 12A is a side view of the adjustable rear mount assembly of FIG. 11A, illustrating a process for securing camera mounting system to a structure via dual straps.
Figure 12B:
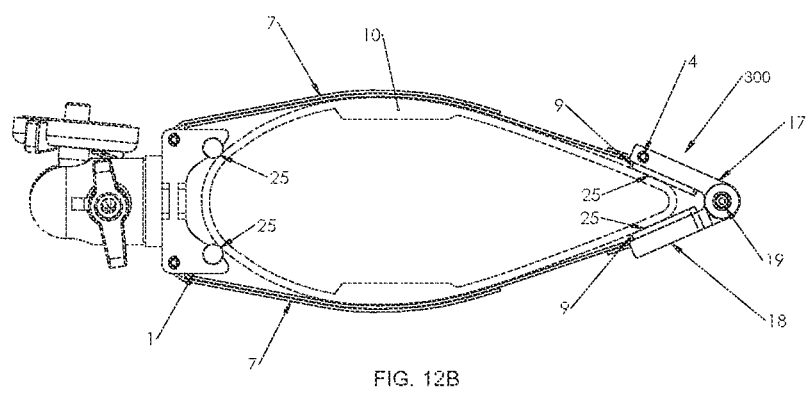
FIG. 12B is a perspective view of the adjustable rear mount assembly of FIG. 12A for a larger structure.
Figure 12C:
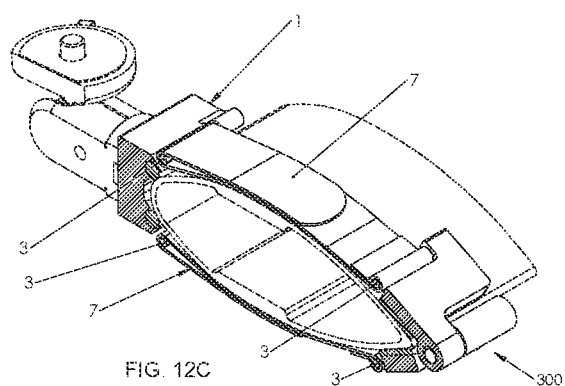
FIG. 12C is a perspective cross-section view of the adjustable rear mount assembly of FIG. 12A, illustrating a process for securing the camera mounting system to a structure via dual straps.

FIGS. 12A-12C show a process of manner of mounting the clamp body 1 and clamp jaws 17 and 18 to a strut 10 using pair of Velcro straps 7. The straps 7 from the clamp jaws 17 and 18 are threaded through the strap mounting rods 3 on the clamp body 1 (similar to the strut mount configuration described above), and redirected toward the rear and drawn tight around strut 10, as shown.

FIG. 12A is a side view of the clamp body 1, and clamp jaws 17 and 18, for strut mount configuration, illustrating a process of feeding an upper strap 7 around an upper rod 3 for securing the clamp 1 and jaw 17 to strut structure 10. The same process is used for feeding a lower strap 7 around a lower rod 3 to secure the clamp 1 and jaw 18 to strut structure 10. FIG. 12C is a perspective cross-section view of FIG. 12A. FIG. 12B shows use of longer straps 7 for securing clamp body 1, and clamp jaws 17 and 18, for a strut of a larger size than that in FIG. 12A. The angle of the jaws 17 and 18 is adjusted to accommodate a strut 10 with larger angle.

When the straps 7 are drawn tight, the rubber clamping feet 2 of clamp 1 contact the front of the strut 10 providing a non-marring clamping force. Also at the same time, the rubber sheets 9 of the clamp jaws 17 and 18 contact the rear portion of the strut 10 providing an additional clamping force. FIG. 12A illustrates contacts between the front and rear body clamps with the strut 10, illustrated as tangent points 25 where elements 2 and 9 engage the surfaces of strut 10.

FIGS. 12A and 12B illustrate adjustability of the rear clamp assembly 300 for attachment to varying shapes and sized struts 10. The Adjustable rear clamp assembly 300 is adjusted by loosening the knurled setscrew 21, then the clamp screw 19 is loosened to allow the adjustable clamp jaws 17 and 18 to rotate freely on the screw 19. The adjustable rear clamp assembly 200 is then placed on the desired struts trailing edge and the clamp jaws 17 and 18 are rotated to match the profile of the trailing edge of the strut as shown in FIGS. 12A and 12B. Once the position is set, the clamp screw 19 is tightened allowing the serrated Belleville washers 20 to reset themselves. After clamp screw 19 is tightened, the knurled setscrew 21 is tightened to further lock the angle of the clamp jaws 17 and 18.

This assembly 300 is also useful with sailboat masts, bicycles or any other mounting surface (structure) with tubing having a similar shape to an aircraft strut. Different straps can be installed to facilitate larger and smaller tubular shapes.

FIGS. 13, 14A-14B, illustrate a fourth embodiment of the camera mounting system, comprising an assembly 100 and a bund 22, for a fourth configuration of the camera mounting system as a Front Clamp Bund configuration.

FIG. 13 shows a perspective view of the front mount assembly 100 in the bund strap configuration. FIG. 14A is a side view that shows the clamping method used for the front mount assembly 100 in the bund strap configuration. FIG. 14B is cross-section view that shows the clamping method used for the front mount assembly 100 in the bund strap configuration.

This configuration is similar to the Tubular Mount configuration shown in FIGS. 1 and 4 with the addition of a friction bund 22 which is threaded through the strap 7 and positioned so that each side of the friction bund 22 wraps around the trailing edge of the strut 10 as shown in FIG. 14A. The clamp body 1 and the strap 7 having bund 22 thereon, are mounted on the strut 10 in a similar fashion as in the Tubular Mount configuration.

The purpose of the friction bund 22 is to restrict the ability of the single strap 7 to allow the clamp body 1 to rotate. This configuration is particularly useful on struts with a short Chord length where it may be difficult to use the rear clamp assembly 200 with its dual strap system. The bund strap configuration can also be used on a tubular structure where the added friction of the friction bund 22 can be of benefit to keep the mount from rotating.

FIGS. 9A-9C, illustrate a fifth embodiment of the camera mounting system, comprising the assembly 400 for a fifth configuration of the camera mounting system as a Heavy Payload configuration. The assembly 400 comprises two or more assemblies 100 and one or more joining plates 13.

FIGS. 9A-9C show how multiple front mount assemblies 100 can be joined together with a joining plate 13 to facilitate mounting cameras with heavier payloads. The clamp body of each front mount assembly 100 is attached to the joining plate 13 with socket head cap screws 14. Each assembly 100 is then mounted on a strut in a similar fashion as described hereinabove. The heavier payload configuration can be used with the front mount assembly 100 in either the strut mount configuration or tubular mount configuration. For use with larger cameras, a larger ball head 15 may be used, which is attached to the plate 13 with a mounting screw 16.

Referring to FIG. 9C, in addition to a single joining plate 13, in one embodiment multiple front mount assemblies 100 can be added with multiple joining plates 13 to span across a cluster of tubes 11 at varying angles to one another and on different contact planes. As shown in FIG. 9C, this provides a rigid structure capable of carrying and stabilizing a very heavy payload with the loads spread over multiple front mount assemblies 100 contacting multiple tubes 11.

Figure 10:
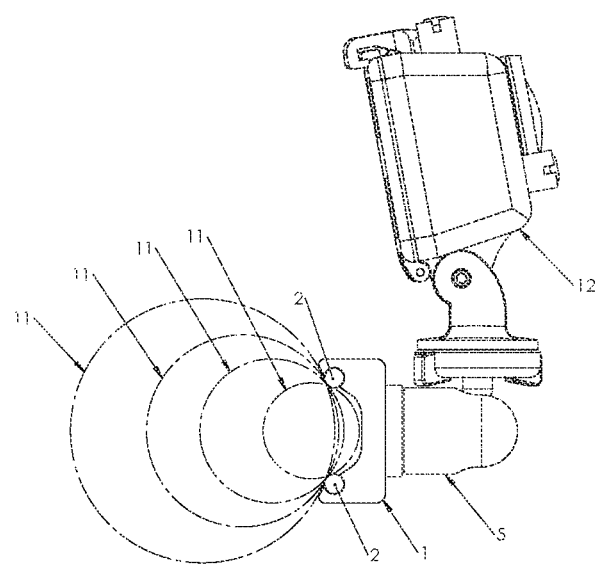
FIG. 10 shows an embodiment of the camera mounting system comprising a front mount assembly that can be mounted on tubular structures of varying diameters.

FIG. 10 shows how a front mount assembly 100 can be mounted on tubular structures 11 of varying diameters. The main front clamp body 1 is designed to have the rubber clamping feet 2 spaced in such a way to mount to tubular shaped structures of differing diameters. This is also applicable with the strut mount configuration as aircraft wing strut sizes change. The front mount clamp body 1 can be made in multiple sizes (e.g. small, medium, large, etc.) for use in a range of mounting surface diameters. Rear clamp body 8 can also be made multiple sizes to work with varying sized aircraft wing struts 10.

Embodiments of the camera mounting system allows mounting to different objects and vehicles provided the rubber contact points (i.e., rubber clamping feet 2, rubber contact sheet 9), are able to contact the mounting surface and the strap 7 can be wrapped around the object and tightened. This allows the camera mounting system to be used in multiple different applications, thus alleviating the need for specialized camera mounts for every application.

In one embodiment, the rigid components of the camera mounting system including main front clamp body 1, rear clamp body 8, adjustable clamp jaws 17 and 18, can be made out of metal machined from billet, cast metal or made from a custom metal extrusion. The main front clamp body 1, rear clamp body 8, adjustable clamp jaws 17 and 18 can also be injection molded in plastic, made on a 3D printer, as well as made with composite material such as a carbon fiber matrix. For mounting, Velcro straps 7 selected for each configuration may be used. The camera mounting system includes provisions with additional tapped holes 26 in the clamp body 1 shown in FIG. 3 to allow other mounting provisions that allow changing the Velcro straps 7 to buckles, ratchet straps or elastic rubber straps with or without holes or provisions for different closure systems (e.g., boa closure system). In the bund strap configuration, the friction bund 22 can be made from multiple materials (e.g., rubber, leather, composite, thin metal or plastics, etc.), to provide the desired amount of friction.

The mounting clamps 1 and 8 interact with the tubes and struts via dual tangent point rubber contact points 25. The camera mounting system is useful with different diameter tubes and struts due to said tangent contact points 25.

The mounting clamps 1 and 8 facilitate engaging structures 10 or 11 utilizing opposing tangent points 25 via elements 2 and 9, respectively. The location of each tangent point 25 is based on the curvilinear profile of structures 10 or 11, as illustrated by example in FIGS. 7A, 8A, 12A-12B and 14A. The adjustable jaws 17 and 18 function in a similar manner when assembled in the adjustable rear mount assembly 300 and achieve contact tangent points 25 items elements 2 and 9, and front and rear surfaces of strut 10, respectively, a shown in FIGS. 12A-12B.

Further use of dual opposing straps 7 (e.g., FIGS. 6A-6B, 7A-7C, 11A-11B, 12A-12C) provide roll stability for the camera mounting system. The camera mounting system allows using straps 7 of different lengths based on application, depending on the diameter of the mounting tube or strut. For a larger diameter tube or strut, a longer strap 7 can be used. Though the mounting system herein has been described in certain embodiments for use in conjunction with mounting a camera, embodiments of the mounting system can be used for mounting other items (e.g., lighting, fixtures, etc.) on various structures. Further, though the mounting system herein has been described in certain embodiments for mounting on vehicles, embodiments of the mounting system can be used for mounting on other structures as well.

In one embodiment, the camera mounting system can be easily reconfigured from a hand rail to ATV to Race Car to Airplane to Hang glider and be installed and removed quickly. The camera mounting system can be easily installed and removed completely from a mounting surface.

In the description above, numerous specific details are set forth. However, it is understood that embodiments of the camera mounting system may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments of the camera mounting system have been described and shown in the accompanying drawings, it is to be understood that such embodiments are merely illustrative of, and not restrictive on, the broad camera mounting system, and that the camera mounting system not be limited to the specific constructions and arrangements shown and described, since various other modifications may occur to those ordinarily skilled in the art.

What is claimed is:

1. A mounting system for mounting a load on a structure, comprising:
    a first strap having a distal end and a proximal end;
    a second strap having a distal end and a proximal end;
    a first clamp body for supporting a load;
    a second clamp body;
    the first clamp body including a catch mechanism for engaging at least one end of the first strap;
    the first clamp body further including a clamp mechanism for engaging a structure;
    the second clamp body including a catch mechanism for engaging at least one end of each strap; and
    the second clamp body further including a clamp mechanism for engaging a structure;
    wherein:
        at least one of the clamp mechanisms is rigid and comprises a pair of protruding spaced feet configured for engaging an arcuate section of said structure at dual tangent points;
    the catch mechanism of the first clamp body is configured for engaging at least one end of each strap;
        the first strap is configured for tightening around at least a portion of the structure between the catch mechanism of the first clamp body and the catch mechanism of the second clamp body; and
        the second strap is configured for tightening around at least a portion of the structure between the catch mechanism of the first clamp body and the catch mechanism of the second clamp body;
        whereby the first clamp body and the second clamp body are maintained on the structure.

2. The mounting system of claim 1, wherein:
    at least one of the clamp mechanisms comprises a pair of spaced feet configured for engaging an arcuate section of said structure at dual tangent points.

3. The mounting system of claim 1, wherein:
    a proximal end of the first strap is removably engaged with the catch mechanism of the second clamp body; and
    the first strap is configured for tightening around at least a portion of the structure and engaging said distal end of the first strap with the catch mechanism of the first clamp body;
    wherein said catch mechanism of the second clamp body comprises mounting rods removably disposed on the second clamp body for engaging a strap.

4. The mounting system of claim 1, wherein:
    the clamp mechanism of second clamp body comprises an arcuate body for engaging an arcuate structure at dual tangent points.

5. The mounting system of claim 1, wherein the second clamp body is adjustable.

6. The mounting system of claim 5, wherein:
    the clamp mechanism of the second clamp body comprises a pair of hinged jaws, such that the angle between the jaws is selectively adjustable to accommodate the surface of said structure.

7. The mounting system of claim 2 wherein the clamp mechanism of the second clamp body includes an elongated contact area for engaging an arcuate structure at dual tangent points.

8. The mounting system of claim 1, wherein:
    the clamp mechanism of the first clamp body comprises a contact area for engaging a structure at dual tangent points; and the clamp mechanism of second clamp body comprises a contact area for engaging the structure at dual tangent points.

9. The mounting system of claim 2, wherein the second clamp body is flexible.

10. The mounting system of claim 2, wherein the second clamp body comprises a pair of spaced feet configured for engaging an arcuate structure at dual tangent points.

11. The mounting system of claim 1, wherein:
at least one of the clamp mechanisms comprises a pair of elongated spaced rubber feet configured for engaging an arcuate section of said structure at dual tangent points;
the spaced rubber feet are removable and are maintained in pockets of the corresponding clamp body via interference fit.

12. A mounting system for mounting a load on a structure, comprising:
a first engagement mechanism configured for engaging a structure and supporting a load;
a second engagement mechanism configured for engaging said structure; and
a first strap;
wherein:
at least one of the clamp mechanisms is rigid and comprises a pair of protruding spaced feet configured for engaging an arcuate section of said structure at dual tangent points;
the first engagement mechanism includes a clamp mechanism for engaging said structure, and the first engagement mechanism further includes a catch mechanism for coupling to the strap;
the second engagement mechanism comprises a coupling mechanism for engaging the strap; and
the strap is configured for tightening around at least a portion of the structure between the first engagement mechanism and the second engagement mechanism, whereby the first engagement mechanism and the second engagement mechanism are maintained on the structure.

13. The mounting system of claim 12, wherein:
the clamp mechanism of the first engagement mechanism comprises an elongated contact area for engaging at least a portion of the structure at dual tangent points.

14. The mounting system of claim 13, wherein:
the second engagement mechanism includes an elongated contact area for engaging a portion of the structure.

15. The mounting system of claim 14, wherein:
the second engagement mechanism comprises a friction bund on said strap for frictionally engaging a portion of the structure.

16. The mounting system of claim 12, wherein the catch mechanism of the first engagement mechanism is configured to coupling to coupling points on the strap, such that the second engagement mechanism is disposed on the strap between said coupling points.

17. The mounting system of claim 12, further comprising:
a second strap configured for tightening around at least a portion of the structure between the first engagement mechanism and the second engagement mechanism, whereby the first engagement mechanism and the second engagement mechanism are maintained on the structure.

18. The mounting system of claim 17, wherein the second engagement mechanism is adjustable.

19. The mounting system of claim 17, wherein:
a proximal end of the first strap is engaged with the first engagement mechanism, and a distal end of the first strap is engaged with the second engagement mechanism; and
a proximal end of the second strap is engaged with the first engagement mechanism, and a distal end of the second strap is engaged with the second engagement mechanism;
whereby the first engagement mechanism and the second engagement mechanism are maintained on the structure.

20. The mounting system of claim 12, wherein:
said structure comprises a tubular structure; and
the first engagement mechanism further includes a ball mount interface configured for coupling a load on the first engagement mechanism.

\* \* \* \* \*